UNITED STATES PATENT OFFICE.

MAURICE DINESMAN, OF PARIS, FRANCE.

PROCESS OF MAKING THYMOL.

SPECIFICATION forming part of Letters Patent No. 697,994, dated April 22, 1902.

Application filed July 22, 1901. Serial No. 69,257. (No specimens.)

*To all whom it may concern:*

Be it known that I, MAURICE DINESMAN, a subject of the Russian Emperor, and a resident of Paris, France, have invented certain new and useful Improvements in the Process of Manufacturing Thymol, of which the following is a specification.

The object of the present invention is a cheap means of manufacturing thymol.

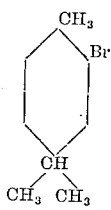

One part of 2-bromo-para-cymene is added gradually at normal temperature to three parts of fuming sulfuric acid containing fifteen to twenty per cent. of anhydrid, so as to obtain a complete solution. After cooling, two to four parts of water are added, causing the division of the liquid into two strata, the upper one being composed of diluted sulfuric acid, the lower one containing a solution of sulfonic acids. The solution of diluted sulfuric acid is drawn off, and the solution of sulfuric acids is cooled. After a certain time the sulfonic acid 2-bromo-para-cymene crystallizes. The crystallization can be hastened by the addition of a crystal already formed. The acid is then filtered. The mother-lye is again changed into bromo-cymene by the elimination of the sulfonic group. Four parts of the sulfonic bromo-cymene acid obtained as described are heated to 170° centigrade during about eighteen hours in a digester with five parts of powdered zinc and twenty-five parts of concentrated ammonia. An almost complete elimination of the bromin is thus effected. The ammonia is then entirely evaporated, and the oxid of zinc is eliminated by filtering. The solution is concentrated in order to crystallize any bromo-cymene sulfonate of zinc which may have escaped the reaction. The filtered solution is evaporated dry. The residue is pulverized and put into nine parts of melted hydroxid of potassium, which is maintained for a short while at a temperature of about 300° centigrade. The end of the reaction is recognized by the molten mass being separated into two strata, the lower one containing melted potash, the upper one thymolate of potassium. The product of the reaction after being cooled is dissolved in water, and the thymol is precipitated in this solution by diluted sulfuric acid. It is purified by steam distillation.

The thymol, which is at first oily, is changed into a crystalline mass when a crystal of thymol is placed therein.

Having fully described my invention, what I claim, and desire to secure by Letters Patent, is—

1. A process for the manufacture of para-cymene-3-sulfonic acid, which consists in heating during several hours, in a digester, at a temperature between 100° centigrade and 170° centigrade, a mixture of 2-bromo-para-cymene 3 or 5 sulfonic acid with ammonia and powdered zinc, substantially as described.

2. The process of manufacturing thymol which consists in melting with alkaline hydroxid at temperatures bordering on 300° centigrade para-cymene-3-sulfonic acid, obtained by heating for several hours at a temperature between 100° centigrade and 170° centigrade, a mixture of 2-bromo-para-cymene sulfonic acid with ammonia and powdered zinc, substantially as described.

In testimony whereof I have hereunto set my hand in presence of two witnesses.

MAURICE DINESMAN.

Witnesses:
ADOLPH STURM,
EDWARD P. MACLEAN.